United States Patent
Jerwick (10) Patent No.: US 8,292,780 B2
(45) Date of Patent: Oct. 23, 2012

(54) POWERTRAIN WITH INPUT SHAFT AND ENGINE SPEED SYNCHRONIZATION AND METHOD FOR SHIFTING GEARS IN A POWERTRAIN

(75) Inventor: John Jerwick, Hagerstown, MD (US)

(73) Assignee: Mack Trucks, Inc., Greensboro, NC (US)

( * ) Notice: Subject to any disclaimer, the term of this patent is extended or adjusted under 35 U.S.C. 154(b) by 284 days.

(21) Appl. No.: 12/935,196

(22) PCT Filed: Apr. 28, 2008

(86) PCT No.: PCT/US2008/061735
§ 371 (c)(1),
(2), (4) Date: Sep. 28, 2010

(87) PCT Pub. No.: WO2009/134241
PCT Pub. Date: Nov. 5, 2009

(65) Prior Publication Data
US 2011/0034297 A1    Feb. 10, 2011

(51) Int. Cl.
*B60W 10/08* (2006.01)
(52) U.S. Cl. ......................................................... 477/5
(58) Field of Classification Search .................... 477/5
See application file for complete search history.

(56) References Cited

U.S. PATENT DOCUMENTS

| | | | | |
|---|---|---|---|---|
| 3,478,851 A | * | 11/1969 | Smyth et al. | 192/3.55 |
| 5,337,848 A | * | 8/1994 | Bader | 180/65.25 |
| 5,704,440 A | | 1/1998 | Urban et al. | |
| 5,755,302 A | | 5/1998 | Lutz et al. | |
| 5,943,918 A | * | 8/1999 | Reed et al. | 74/661 |
| 5,979,257 A | * | 11/1999 | Lawrie | 74/335 |
| 5,993,350 A | * | 11/1999 | Lawrie et al. | 477/5 |
| 6,019,183 A | | 2/2000 | Shimasaki et al. | |
| 6,022,290 A | * | 2/2000 | Lyon | 477/108 |
| 6,041,877 A | | 3/2000 | Yamada et al. | |
| 6,632,155 B1 | * | 10/2003 | Hohn | 477/3 |
| 6,645,105 B2 | * | 11/2003 | Kima | 475/5 |
| 6,691,808 B2 | * | 2/2004 | Stenvall et al. | 180/65.25 |
| 6,732,601 B2 | | 5/2004 | Suzuki | |
| 6,884,199 B2 | * | 4/2005 | Notsu et al. | 477/5 |
| 6,907,950 B2 | * | 6/2005 | Notsu et al. | 180/65.7 |

(Continued)

OTHER PUBLICATIONS

International Search Report for corresponding International Application PCT/US2008/061735.

*Primary Examiner* — Dirk Wright
(74) *Attorney, Agent, or Firm* — WRB-IP LLP (57) ABSTRACT

A powertrain includes a prime mover, a transmission, an input shaft adapted to transmit torque between the prime mover and the transmission, an output shaft adapted to transmit torque between the transmission and a driveline, and a master clutch between the prime mover and the input shaft, the clutch being movable between a disengaged position and an engaged position in which the clutch is not and is adapted to transmit torque between the prime mover and the input shaft, respectively. An electric motor is arranged for torque transmission with at least one of the input shaft and the output shaft, and a controller is provided for controlling the electric motor to rotate the input shaft at a rotational speed within an operating range of the prime mover when the clutch is moved from the disengaged to the engaged position.

24 Claims, 5 Drawing Sheets

U.S. PATENT DOCUMENTS

| | | |
|---|---|---|
| 7,070,538 B2 | 7/2006 | Babcock |
| 7,179,195 B2 * | 2/2007 | Joe ................................... 477/5 |
| 7,328,763 B2 * | 2/2008 | Gouda et al. ............. 180/65.285 |
| 7,416,511 B2 * | 8/2008 | Nishina et al. .................... 477/5 |
| 2003/0205422 A1 | 11/2003 | Morrow et al. |
| 2006/0213706 A1 | 9/2006 | Couda et al. |
| 2007/0049441 A1 | 3/2007 | Schmidt |
| 2007/0261901 A1 | 11/2007 | Janson et al. |

* cited by examiner

POWERTRAIN WITH INPUT SHAFT AND ENGINE SPEED SYNCHRONIZATION AND METHOD FOR SHIFTING GEARS IN A POWERTRAIN

BACKGROUND AND SUMMARY

The present invention relates generally to a powertrain for use in, e.g., a vehicle, and, more particularly, a powertrain with an arrangement for synchronizing speeds of an engine and an input shaft between the engine and a drive train.

Automated manual transmissions are desirable in many vehicular applications, particularly because of how they tend to simplify the driving operation while still offering the operator a substantial amount of control that may not be available in automatic transmissions. Heavy duty trucks with automated manual transmissions are not typically released by the original equipment manufacturer to vocations such as construction where a vehicle may be fielded in an environment that may cause the vehicle to lose speed rapidly while shifting gears. A vehicle with an automated transmission can lose speed during a shift because torque from the engine that drives the wheels must be interrupted to disengage one gear and to engage the next gear selected.

Automated manual transmissions are shifted by first breaking torque of the engine to the drive train by both reducing the fuel to the engine and opening the main disconnect or master clutch. Next the transmission moves the gear engagement clutch to the neutral position. The main disconnect clutch is briefly closed to synchronize transmission shaft speeds to shift the gear clutch to the desired transmission gear. The main disconnect clutch is then closed and the engine resumes providing torque to the drive train.

Excessive loss of road speed while shifting an automated manual transmission may cause the transmission to either connect a gear that is outside of the engine operating range (here meaning below idle or above an engine governed speed) or cause the transmission to recalculate the appropriate gear for operation and engage that gear. This recalculation and gear engagement increases the time that engine torque is not provided to the wheels. Connection to a gear outside the engine operating range or excessive interruption of application of engine torque to the drivetrain can result in engine stall, engine over speed, and/or stoppage of the vehicle. Rapid loss of speed during shifting can occur in conditions such as where there are level roads made of soft, sandy, snowy, or muddy soil, very steep paved or unimproved road grades, typically over ten percent in inclination, and during plowing snow. Accordingly, vehicles that are expected to be subjected to such conditions are typically not provided with automated manual transmissions.

It is desirable to provide a powertrain that can minimize the possibility of engine stalling or damage due to attempts to engage a clutch between an engine and an input shaft when the input shaft is rotated at a speed outside of the operating range of the engine. It is also desirable to facilitate the use of automated manual transmissions and manual transmissions in applications such as those for vocational vehicles that tend to be subject to substantial loss of speed during shifting operations.

According to an aspect of the present invention, a powertrain comprises a prime mover, a transmission, an input shaft adapted to transmit torque between the prime mover and the transmission, an output shaft adapted to transmit torque between the transmission and a driveline, and a master clutch between the prime mover and the input shaft, the clutch being movable between a disengaged position and an engaged position in which the clutch is not and is adapted to transmit torque between the prime mover and the input shaft, respectively. An electric motor is arranged for torque transmission with at least one of the input shaft and the output shaft, and a controller is provided for controlling the electric motor to rotate the input shaft at a rotational speed within an operating range of the prime mover when the clutch is moved from the disengaged to the engaged position.

According to another aspect of the present invention, a method for shifting gears in a transmission comprises disengaging a master clutch between a prime mover and an input shaft to the transmission, shifting gears in the transmission while the master clutch is disengaged, engaging the master clutch between the prime mover and the input shaft after shifting gears in the manual transmission, and controlling a rotational speed of the input shaft after shifting gears and prior to engaging the master clutch so that the rotational speed of the input shaft is within an operating range of the prime mover.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

A powertrain for a vehicle 21 according to an embodiment of the present invention is shown in FIGS. 1A-1D. The powertrain includes a prime mover 23, such as an internal combustion engine, such as a diesel engine, a transmission 25, and an input shaft 27 adapted to transmit torque between the prime mover and the transmission. Except where otherwise noted, the prime mover 23 will be referred to as an engine, it being understood that the present invention is not limited to embodiments in which a prime mover is an engine. An output shaft 29 is adapted to transmit torque between the transmission 25 and a driveline 31. The transmission 25 will ordinarily be an automated manual transmission or a manual transmission. A six speed transmission 25 is illustrated, however, it will be appreciated that the present invention pertains to transmissions having other numbers of speeds, such as a twelve speed transmission as used in many conventional vocational vehicles.

Figure 1A:
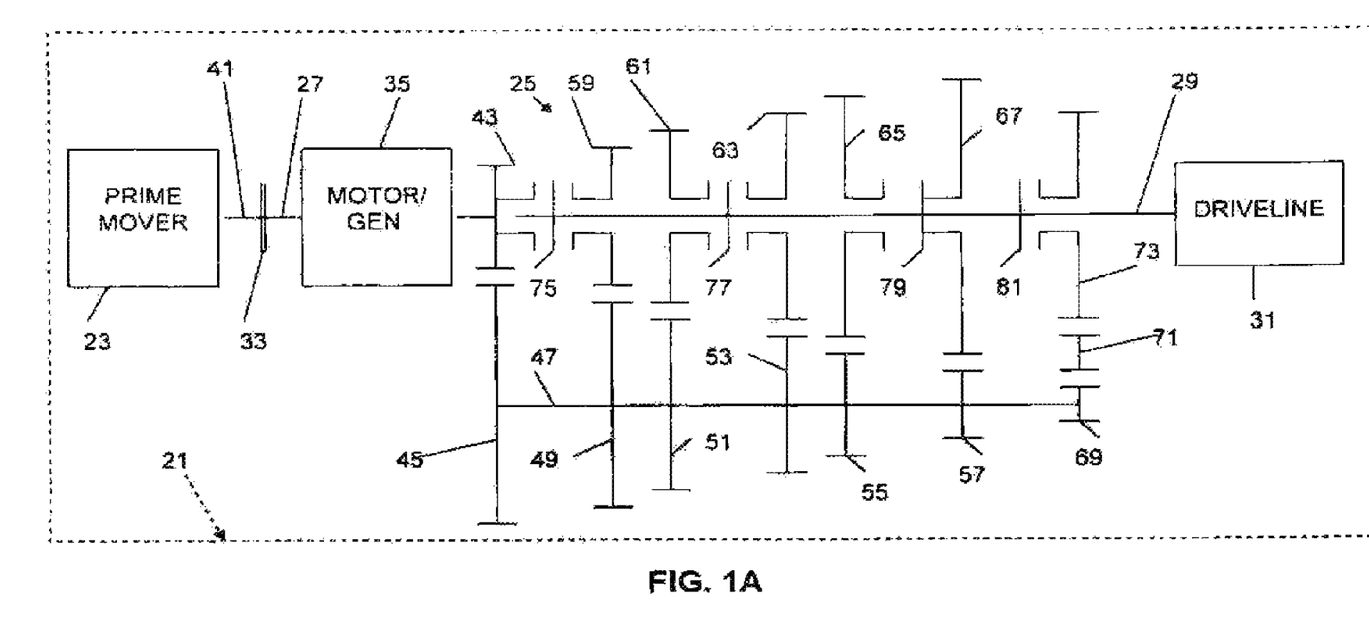
FIGS. 1A-1D schematically show phases of a gear shifting operation in a powertrain.
Figure 1B:
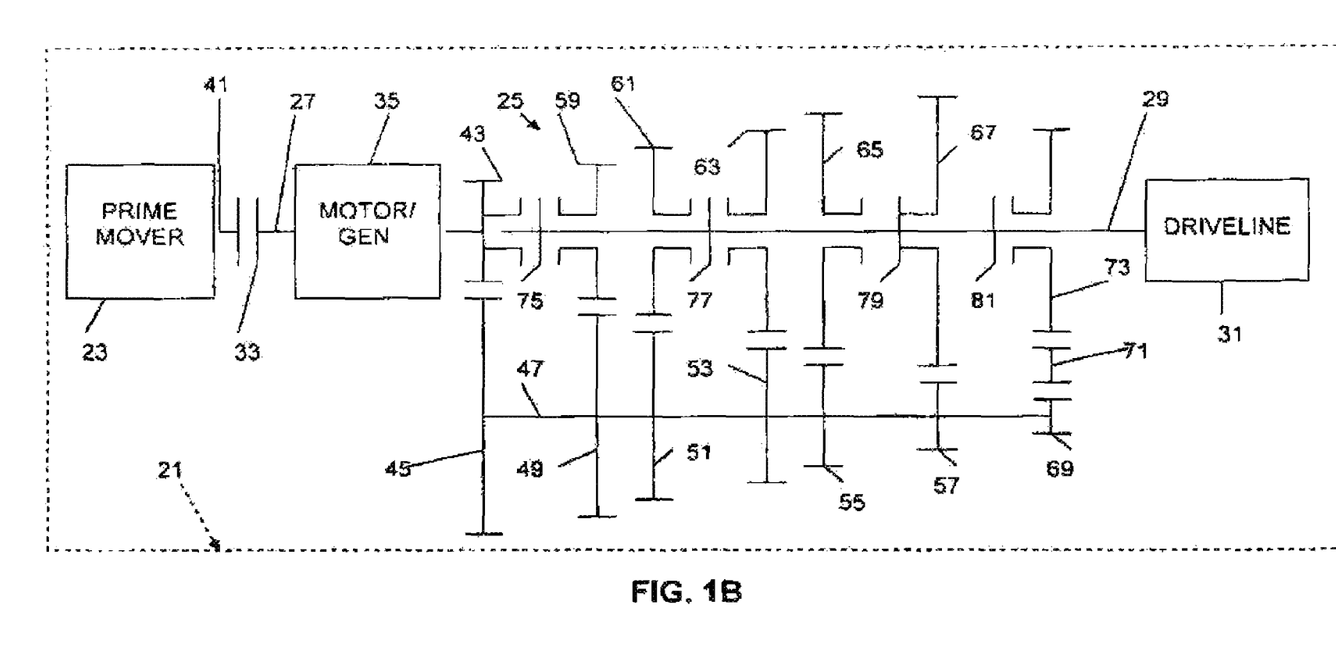
Figure 1C:
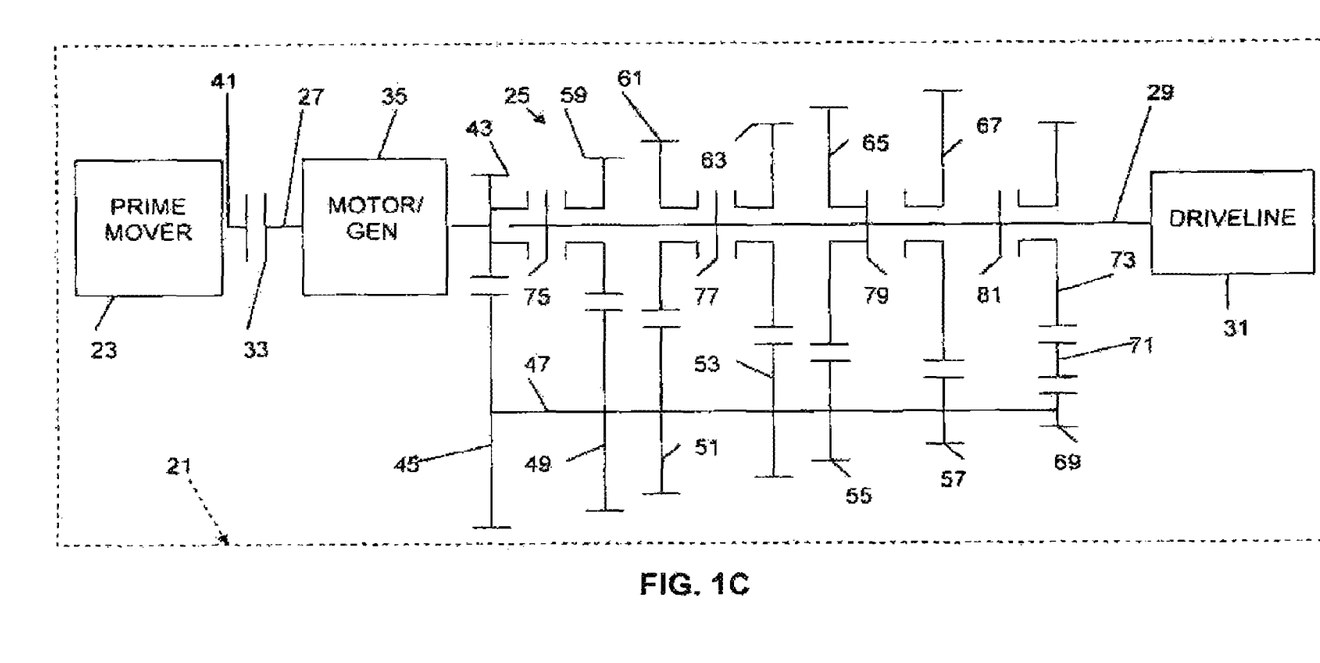
Figure 1D:
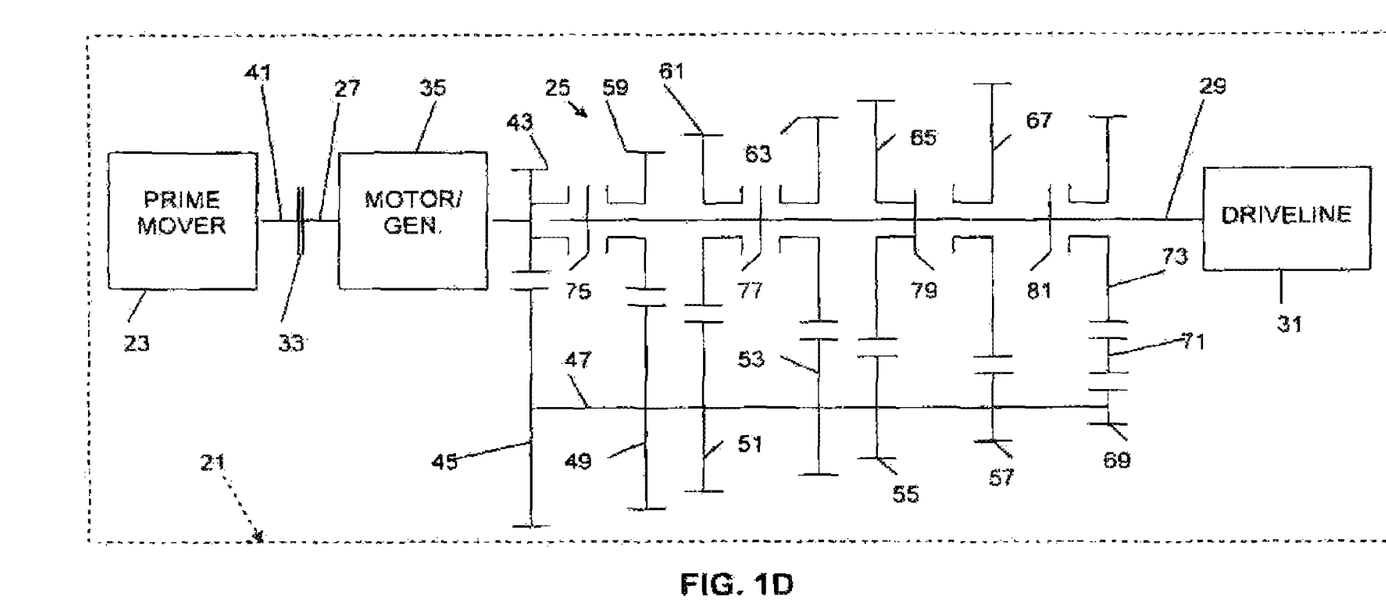

A master clutch 33 is provided between the engine 23 and the input shaft 27. The master clutch 33 is movable between a disengaged position as seen in FIGS. 1B and 1C and an engaged position as seen in FIGS. 1A and 1D in which the master clutch is not and is adapted to transmit torque between the engine 23 and the input shaft 27, respectively.

Figure 2A:
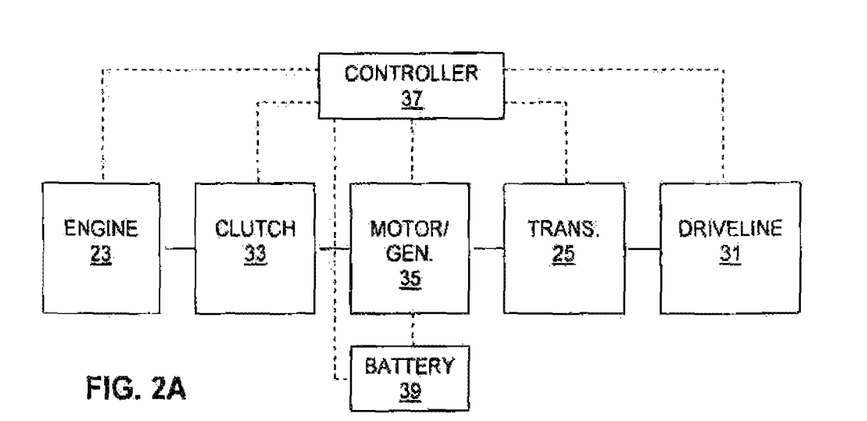
FIGS. 2A-2C schematically show various arrangements of components in a powertrain.
Figure 2B:
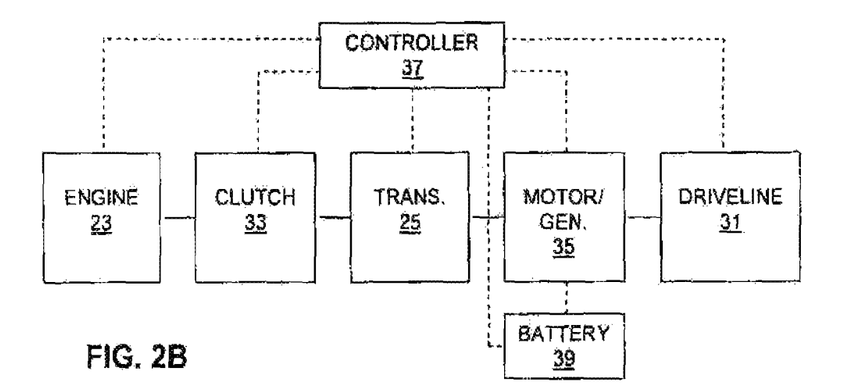
Figure 2C:
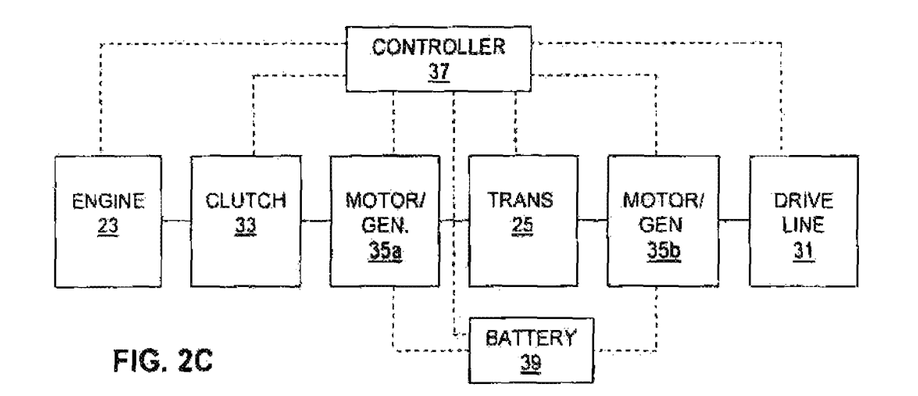

An electric motor 35 is arranged for torque transmission with at least one of the input shaft 27 and the output shaft 29. As seen in FIGS. 2A-2C, the electric motor can comprise an electric motor 35 arranged for torque transmission with the input shaft 27 only (FIG. 2A), an electric motor 35 arranged for torque transmission with the output shaft 29 only (FIG. 2B), or electric motors 35a and 35b arranged for torque transmission with both the input shaft and the output shaft (FIG. 2C).

As seen in FIGS. 2A-2C, a controller 37 is provided for controlling the electric motor 35 to rotate the input shaft 27 at a rotational speed within an operating range of the engine 23 when the master clutch 33 is moved from the disengaged to the engaged position. Where the engine 23 is a diesel engine, it will typically have an operating range of about 650-2100 rpms, where 650 rpms is idle speed, below which such an engine has a tendency to stall, and 2100 rpms is a speed above which such an engine tends to be vulnerable to damage. These values may, of course, be different for different engines.

It is presently believed that aspects of the present invention are particularly applicable to use in vocational vehicles, e.g., snow plows, dump trucks, garbage trucks, etc., that tend to operate under conditions in which substantial changes in input shaft speed can occur during torque interruptions such as during shifting operations in manual or automated manual transmissions. However, it is also believed that aspects of the present invention are also applicable for use in other types of vehicles, such as over-the-road trucks and the like. There may, of course, also be non-vehicular applications for aspects of the present invention.

The electric motor 35 can be adapted to operate as a generator to limit the rotational speed of the input shaft 27 and/or as a motor to increase the rotational speed of the input shaft. In this regard, torque transmission from the input shaft 27 to the electric motor 35 can be used to generate power that can be stored in an energy storage device such as a battery 39. The battery 39 can be used to power the electric motor 35 when it operates as a motor to increase the rotational speed of the input shaft 27. The battery 39 may communicate with the controller 37, such as to indicate state of charge, and may be controlled by the controller, such as by preventing further charging of the battery by the motor/generator 35 when the battery is fully charged.

It is presently considered that aspects of the present invention have particular application where the transmission 25 is an automated manual transmission. FIGS. 1A-1D show components of an automated manual transmission 25. The illustrated transmission 25 comprises a first headset gear 43 mounted on the input shaft 27 and meshing with a second headset gear 45 mounted on a counter shaft 47. Input gears 49, 51, 53, 55, and 57 are mounted on the countershaft in a substantially axially and rotationally fixed manner and mesh with output gears 59, 61, 63, 65, and 67, respectively, which are mounted on the output shaft 29 such that they are substantially axially fixed but do not rotate with the output shaft. Reverse input gear 69 meshes with idler gear 71 which meshes with output gear 73 mounted on the output shaft 29. Axially movable clutches 75, 77, 79, and 81 are splined to the output shaft 29 and are movable into and out of engagement with clutch components associated with the first headset gear and the output gears. Clutch 75 is movable into and out of engagement with clutch components associated with the first headset gear 43 and the output gear 59. Clutch 77 is movable into and out of engagement with clutch components associated with the output gears 61 and 63. Clutch 79 is movable into and out of engagement with clutch components associated with the output gears 65 and 67. Clutch 81 is movable into and out of engagement with output gear 73.

A gear shifting operation ordinarily occurs according to the sequence illustrated in FIGS. 1A-1D, showing shifting from first gear to second gear. FIG. 1A shows first gear engaged with torque from the engine 23 being transmitted through the master clutch 33 to the input shaft 27 and the first headset gear 43, from the first headset gear to the meshing second headset gear 45 and the countershaft 47 on which it is mounted and the input gear 57 mounted on the countershaft, from the input gear 57 to the meshing output gear 67 (first gear) mounted on the output shaft, 29 via the clutch component of the output gear 67 to the clutch 79 on the output shaft, and from the output shaft to the driveline 31.

When it is desired to shift to, for example, second gear the master clutch 33 is disengaged as seen in FIG. 1B, thereby interrupting power transmission from the engine 23 to the input shaft 27. As seen in FIG. 1C, while the master clutch 33 is open, the clutch 79 on the output shaft 29 can be moved out of engagement with the clutch components of the output gear 67 and into engagement with the clutch components of the output gear 65 (second gear). FIG. 1D shows that, after the clutch 79 is moved into engagement with the clutch components of the output gear 65, the master clutch 33 can be engaged and power transmission from the engine 23 to the drive train 31 can resume in second gear. It will be appreciated that a shift from second gear to first gear occurs in substantially the same way as the shift from first to second, with the clutch 79 moving from engagement with the clutch components of the output gear 65 and into engagement with the clutch components of the output gear 67.

While the master clutch 33 is disengaged the speed of the output shaft 29 may be reduced (such as when a vehicle is going uphill or is moving over a substance such as snow, sand, or mud), or may be increased (such as when a vehicle is speeding up as it goes downhill). The controller 37 can be arranged to control the electric motor 35 to rotate the input shaft 27 at a rotational speed substantially equal to a rotational speed of the engine 23, e.g., equal to the rotational speed of a crankshaft 41 of a diesel engine. Thus, if the master clutch 33 is disengaged for some reason, regardless whether during a gear shifting operation, the electric motor 35 can rotate the input shaft 27 at a rotational speed substantially equal to the rotational speed of the engine 23 which can provide for a more even feel to the ride.

The controller 37 can also be arranged to prevent engagement of the master clutch 33 when the rotational speed of the input shaft 27 is below an operating range of the engine 23 and/or when the rotational speed of the input shaft is above an operating range of the engine. When the controller 37 detects that the rotational speed of the input shaft 27 is below or above an operating range of the engine 23, the controller can initiate operation of the electric motor 35 in a suitable fashion to bring the rotational speed of the input shaft to within the operating range of the engine. The electric motor 35 may be controlled to bring the rotational speed of the input shaft to substantially equal the rotational speed of the engine 23 before the controller 37 controls the master clutch 33 to reengage or, instead, the motor may be controlled to bring the rotational speed of the input shaft to within an operating range of the engine before the controller controls the master clutch to reengage.

For example, the vehicle 21 may be operated in first gear at an engine 23 rotational speed within the normal operating range of the engine and the controls and/or an operator may request to shift from first to second gear and therefore will disengage the master clutch 33. If, during the period of disengagement of the master clutch 33, when the transmission 25 is shifted to second gear, the rotational speed of the input shaft 27 slows to a speed below the operating range of the engine, such as might occur when the vehicle is going uphill, the controller 37 can prevent engagement of the master clutch 33 while the transmission remains in second gear and the rotational speed of the input shaft is below the operating range of the engine. Ordinarily, the controller 37 can, while the transmission 25 is in second gear, initiate operation of the electric motor 35 to bring the rotational speed of the input shaft 27 up to within an operating range of the engine 23 or to equal the rotational speed of the engine.

Similarly, the vehicle 21 may be operated in second gear at an engine 23 rotational speed within the normal operating range of the engine and the controls and/or an operator may request to shift from second to first gear and therefore will disengage the master clutch 33. If, during the period of disengagement of the master clutch 33, when the transmission 25 is shifted to first gear, the rotational speed of the input shaft 27 increases to a speed above the operating range of the engine, such as might occur when the vehicle is going downhill, the controller 37 can prevent engagement of the master clutch 33 while the transmission remains in first gear and the rotational speed of the input shaft is above the operating range of the engine. Ordinarily, the controller 37 can, while the transmission 25 is in first gear, initiate operation of the electric motor 35 to function as a generator and reduce the rotational speed of the input shaft 27 to within an operating range of the engine 23 or to equal the rotational speed of the engine.

The controller 37 can also be arranged to initiate operation of the electric motor 35 to drive the input shaft 27 in conjunction with the engine 23 when the master clutch 33 is engaged and rotational speed of the input shaft approaches a lower operating range of the engine. In this way, the controller 37 and electric motor 35 can assist in avoiding stalling of the engine that might occur during times other than during shifting of gears or opening of the master clutch 33. Similarly, the controller 37 can be arranged to initiate operation of the electric motor 35 as a generator to limit rotational speed of the input shaft 27 when the master clutch 33 is engaged and the input shaft is driven by the engine 23 and rotational speed of the input shaft approaches an upper operating range of the engine. In this way, the controller 37 and the electric motor 35 can assist in avoiding damage to the engine that might occur during times other than during shifting of gears or opening of the master clutch 33.

As seen in FIGS. 1A-1D, a method for shifting gears in a transmission 25 comprises disengaging a master clutch 33 to interrupt power transmission between an engine 23 and an input shaft 27 to the transmission. Gears in the transmission 25 are shifted while the master clutch is disengaged, such as is shown in FIGS. 1B-1C wherein the clutch 79 is moved from engagement with the clutch components of the first output gear 67 into engagement with the clutch components of the second output gear 65 while power transmission from the engine 23 is interrupted. The master clutch 33 between the engine 23 and the input shaft 27 is engaged after shifting gears in the manual transmission 25 as seen in FIG. 1D.

A rotational speed of the input shaft 25 is controlled by a controller 37 after shifting gears and prior to engaging the master clutch 33 so that the rotational speed of the input shaft is within an operating range of the engine 23. Ordinarily, the rotational speed of the input shaft 25 is controlled by means of an electric motor 25 that can be operated as a generator to limit the rotational speed of the input shaft 27 and/or that can be operated as a motor to increase the rotational speed of the input shaft.

The electric motor 35 can be controlled by the controller 37 to rotate the input shaft 27 at a rotational speed substantially equal to a rotational speed of a crankshaft 41 of the engine. The master clutch 33 can be controlled by the controller 37 to prevent engagement of the master clutch when the rotational speed of the input shaft 27 is below and/or above an operating range of the engine 23. The controller 37 can also control operation of the electric motor 35 to drive the input shaft 27 in conjunction with the engine 23 when the master clutch 33 is engaged and rotational speed of the input shaft approaches a lower operating range of the engine 23. The controller 37 can also control operation of the electric motor 35 to initiate operation of the electric motor as a generator to limit rotational speed of the input shaft 27 when the master clutch 33 is engaged and the input shaft is driven by the engine 23 and rotational speed of the input shaft approaches an upper operating range of the engine.

In the present application, the use of terms greater than and less than, or corresponding symbols, is illustrative and can be understood to comprise both greater and less than, as well as greater than or equal to and less than or equal to. The use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. A powertrain, comprising:
  a prime mover;
  a transmission;
  an input shaft adapted to transmit torque between the prime mover and the transmission;
  an output shaft adapted to transmit torque between the transmission and a driveline;
  a master clutch between the prime mover and the input shaft, the clutch being movable between a disengaged position and an engaged position in which the clutch is not and is adapted to transmit torque between the prime mover and the input shaft, respectively;
  an electric motor arranged for torque transmission with at least one of the input shaft and the output shaft; and
  a controller for controlling the electric motor to rotate the input shaft at a rotational speed within a non-zero operating range of the prime mover when the clutch is moved from the disengaged to the engaged position.

2. The powertrain as set forth in claim 1, wherein the electric motor is adapted to operate as a generator to limit the rotational speed of the input shaft.

3. The powertrain as set forth in claim 2, wherein the electric motor it adapted to operate as a motor to increase the rotational speed of the input shaft.

4. The powertrain as set forth in claim 1, wherein the electric motor is adapted to operate as a motor to increase the rotational speed of the input shaft.

5. The powertrain as set forth in claim 1, wherein the controller is arranged to control the electric motor to rotate the input shaft at a rotational speed substantially equal to a rotational speed of a crankshaft of the prime mover.

6. The powertrain as set forth in claim 1, wherein the transmission is an automated manual transmission.

7. The powertrain as set forth in claim 1, wherein the controller is arranged to prevent engagement of the clutch when the rotational speed of the input shaft is below an operating range of the prime mover.

8. The powertrain as set forth in claim 1, wherein the controller is arranged to prevent engagement of the clutch when the rotational speed of the input shaft is above an operating range of the prime mover.

9. The powertrain as set forth in claim 1, wherein the controller is arranged to initiate operation of the electric motor to drive the input shaft in conjunction with the prime mover when the clutch is engaged and rotational speed of the input shaft approaches a lower operating range of the prime mover.

10. The powertrain as set forth in claim 9, wherein the controller is arranged to initiate operation of the electric motor as a generator to limit rotational speed of the input shaft when the clutch is engaged and the input shaft is driven the prime mover and rotational speed of the input shaft approaches upper operating range of the prime mover.

11. The powertrain as set forth in claim 1, wherein the controller is arranged to initiate operation of the electric motor as a generator to limit rotational speed of the input shaft when the clutch is engaged and the input shaft is driven by the prime mover and rotational speed of the input shaft approaches an upper operating range of the prime mover.

12. The powertrain as set forth in claim 1, wherein the electric motor comprises a first electric motor arranged for torque transmission with the input shaft and a second electric motor arranged for torque transmission with the output shaft.

13. The powertrain as set forth in claim 1, wherein the electric motor comprises a first electric motor arranged for torque transmission with the input shaft between the master clutch and the transmission.

14. The powertrain as set forth in claim 1, wherein the powertrain comprises a vocational vehicle.

15. A method for shifting gears in a powertrain, comprising:
   disengaging a master clutch between a prime mover and an input shaft to a transmission;
   shifting gears in the transmission while the master clutch is disengaged;
   engaging the master clutch between the prime mover and the input shaft after shifting gears in the manual transmission;
   controlling a rotational speed of the input shaft after shifting gears and prior to engaging the master clutch while the prime mover rotates so that the rotational speed of the input shaft is within an operating range of the prime mover.

16. The method as set forth in claim 15, comprising operating the electric motor as a generator to limit the rotational speed of the input shaft.

17. The method as set forth in claim 16, comprising operating the electric motor as a motor to increase the rotational speed of the input shaft.

18. The method as set forth in claim 15, comprising operating the electric motor as a motor to increase the rotational speed of the input shaft.

19. The method as set forth in claim 15, comprising controlling the electric motor to rotate the input shaft at a rotational speed substantially equal to a rotational speed of a crankshaft of the prime mover.

20. The method as set forth in claim 15, comprising controlling the clutch to prevent engagement of the clutch when the rotational speed of the input shaft is below an operating range of the prime mover.

21. The method as set forth in claim 15, comprising controlling the clutch to prevent engagement of the clutch when the rotational speed of the input shaft is above an operating range of the prime mover.

22. The method as set forth in claim 15, comprising initiating operation of the electric motor to drive the input shaft in conjunction with the prime mover when the clutch is engaged and rotational speed of the input shaft approaches a lower operating range of the prime mover.

23. The method as set forth in claim 22, comprising initiating operation of the electric motor as a generator to limit rotational speed of the input shaft when the clutch is engaged and the input shaft is driven by the prime mover and rotational speed of the input shaft approaches an upper operating range of the prime mover.

24. The method as set forth in claim 15, comprising initiating operation of the electric motor as a generator to limit rotational speed of the input shaft when the clutch is engaged and the input shaft is driven by the prime mover and rotational speed of the input shaft approaches an upper operating range of the prime mover.

* * * * *